(12) United States Patent
Stone

(10) Patent No.: US 6,259,820 B1
(45) Date of Patent: Jul. 10, 2001

(54) PROGRESSIVE JPEG DECODING

(75) Inventor: Harold S. Stone, Princeton, NJ (US)

(73) Assignee: NEC Research Institute, Inc., Princeton, NJ (US)

( * ) Notice: Subject to any disclaimer, the term of this patent is extended or adjusted under 35 U.S.C. 154(b) by 0 days.

(21) Appl. No.: 09/030,496

(22) Filed: Feb. 25, 1998

Related U.S. Application Data

(60) Provisional application No. 60/061,190, filed on Oct. 6, 1997.

(51) Int. Cl.$^7$ ........................................................ G06K 9/46
(52) U.S. Cl. ................................................ 382/250; 382/250
(58) Field of Search .................................... 382/250, 251, 382/252, 253, 233, 240, 248; 358/432

(56) References Cited

U.S. PATENT DOCUMENTS

| | | | | |
|---|---|---|---|---|
| 5,293,228 | * | 3/1994 | Marti | 348/391 |
| 5,600,373 | * | 2/1997 | Chui et al. | 348/397 |
| 5,867,602 | * | 6/1999 | Zandi et al. | 382/248 |
| 5,915,027 | * | 6/1999 | Cox et al. | 380/54 |

OTHER PUBLICATIONS

Lim, Two–Dimentsional Signal and Image Processing, Englewood–Cliffs, NJ: Prentice Hall, 1990.

Stone, "Progressive wavelet correlation using Fourier methods", Submitted for publication to IEEE Transactions on Signal Processing, 1996.

Vetterli, et al. "Tradeoffs in the computation of mono–and multi–dimensional DCT's", Proc. IEEE Int. Conf. Acoust, Speech, and Signal Processing, pp. 999–1002, 1989.

Wallace, "The JPEG still–picture compression standard," CACM, vol. 34, No. 4, pp. 30–44, Apr. 1991.

Duhamel, et al. "Polynomial transform computations of 2–D DTC", Proc. ICASSP–90, 1990.

Feig, et al. "Fast algorithms for the discrete cosine transform", IEEE Trans. on Signal Processing, vol. 40, No. 9, pp. 2174–2193, Sep. 1992.

Jain, et al. "Scalable Compressing for Image Browsing", IEEE Transactions on Consumer Electrons, vol. 40, No. 3, Aug. 1994.

Kamangar, et al. "Fast algorithms for the 2–D discrete cosine transform", IEEE Trans. Comput., vol. C–31, pp. 899–906, Sep. 1982.

Wu, et al. "A two–dimensional fast cosine transform algorithm based on Hou's approach", IEEE Trans. on Signal Processing, vol. 39, No. 2, pp. 544–546, Feb. 1991.

Yeo, et al. "Rapid Scene Analysis on Compressed Video", IEEE Trans. on Circuits and Systems for Video Tech., vol. 5, No. 6, Dec. 1995.

* cited by examiner

Primary Examiner—Andrew W. Johns
Assistant Examiner—Seyed Azarian
(74) Attorney, Agent, or Firm—Scully, Scott Murphy & Presser

(57) ABSTRACT

This invention enables progressively higher resolution images of a JPEG compressed image to be produced in a cost effective manner during the JPEG decompression process. The operation count is very low when images of 1/64th, 1/16th, and 1/4th of full resolution are to be produced without doing a full JPEG decompression. The low resolution images are useful for high speed search, and the ability to produce them without doing full decompression is an important factor in making such search practical.

42 Claims, 3 Drawing Sheets

PROGRESSIVE JPEG DECODING

CROSS-REFERENCE TO RELATED APPLICATIONS

The following patent application is based on and claims the benefit of U.S. Provisional Patent Application Ser. No. 60/061,190, filed Oct. 6, 1997.

BACKGROUND OF THE INVENTION

1. Field of the Invention

The present invention is related generally to the field of image encoding and more particularly to JPEG compression/decompression schemes and methods. It is specifically directed to a methodology of production of low resolution thumbnails directly, at low cost, without doing a full JPEG decompression.

2. Discussion of the Prior Art

The Joint Photographic Experts Group (JPEG) has promulgated a standard for still image compression, known as the JPEG standard, which employs a Discrete Cosine Transform-based algorithm. The JPEG standard is described in a number of publications, including the following references the contents and disclosures of which are incorporated by reference herein: Wallace, "The JPEG Still Picture Compression Standard," IEEE Transactions on Consumer Electronics, Vol. 34, No. 4, pp. 30–44 (April, 1991); Feig, E., and Winograd, S., "Fast algorithms for the discrete cosine transform," IEEE Trans. on Signal Processing., Vol. 40, no. 9, pp. 2174–2193, (September, 1992). Stone, H. S., "Progressive wavelet correlation using Fourier methods," Submitted for publication to IEEE Trans. on Signal Processing, 1996.

As shown in FIG. 1($a$), in the JPEG compression method implementing sequential encoding, the original image is divided into blocks of pixels, each block typically containing 8×8 or 16×16 original image samples. Each 8×8 block of pixels is input to a DCT-encoder element 10 having a forward discrete cosine transform processor 12 that performs a Discrete Cosine Transform (DCT) on each pixel block, producing a representation of the input block as DCT coefficients corresponding to frequencies and amplitudes, rather than corresponding directly to color information. These coefficients are then quantized, or rounded off, by a quantizer element 14 in accordance with a quantization table 16, and DC coding is performed that employs a difference algorithm over all quantized blocks in the image, in a selected scan order. This difference algorithm subtracts a "DC" or zero frequency term corresponding to the mean pixel value of a block, from the DC term of the preceding block. The difference coefficients are then scanned in a different order, such as a zigzag order, and the non-zero coefficients (i.e., blocks in which a difference from the preceding block occurred) are coded to indicate the number of preceding zero coefficients (i.e., the number of pixel blocks in which no change occurred) and also the value of the non-zero difference. An additional compression step known as entropy encoding is performed by encoder element 18 to achieve a more compact coding of the quantized DCT elements. Entropy encoding schemes specified by the JPEG standard include Huffman coding and arithmetic coding, with the optional implementation of entropy encoding tables 19. The output 20 of the DCT encoder 10 is a data stream of compressed image data.

It should be understood that the key feature of JPEG compression is that an image is first segmented into disjoint 8×8 pixel blocks, each of which is replaced by its 2-D DCT. In such a representation, the high frequencies tend to have very small coefficients enabling JPEG quantization to drive most of these coefficients to zero. This enables fewer bits to be stored after encoding.

Decompression is performed by reversing the compression process, producing the displayable image. As shown in FIG. 1($b$), this typically involves inputting the compressed image data into a DCT decoder including an entropy decoder block 27 for decoding the compressed image data stream, e.g., in accordance with a Huffman decoding technique. At the output of the entropy decoder the same data structure that the encoder 10 had at the end of the DCT transform is created. Then, a dequantization block 28 for dequantizing the image samples, and an inverse discrete cosine transform processor 29 for performing an inverse discrete cosine transform taking the decoded 64 DCT coefficients and reconstructing the original image.

Besides the sequential encoding method described, the JPEG standard sets forth other largely incompatible encoding techniques. For instance, in a progressive encoding technique, the image is encoded in multiple scans for applications in which the transmission time is long and viewers prefer to watch the image build up in multiple coarse-to-clear passes. In hierarchical encoding, the image is encoded at multiple resolutions, so that lower-resolution versions may be accessed without first having to decompress the image at its full resolution. Particularly, the hierarchical mode implements "pyramidal" encoding of an image at multiple resolutions, each differing in resolution from its adjacent encoding, e.g., by a factor of two, in either horizontal or vertical dimensions or both. While enabling multiple decompression levels, the hierarchical scheme set forth in the standard requires that each additional level be stored in the compressed image.

As is known, the usefulness of decompression algorithms is determined by the number and the speed of mathematical computations performed to obtain the identifiable decompressed image. Typically, in image searching applications, it is required that each image is fully decompressed before the target image is located, which is a costly proposition as many computations are required to achieve full decompression.

It would thus be highly desirable to provide a means for achieving intermediate levels of decompression of a compressed JPEG image without having to encode the image at multiple resolutions.

Furthermore, it would be desirable to achieve multiple levels of decompression of an image that has been encoded according to the sequential (lossy) encoding standard. In such a technique, one or more decompressed "thumbnail" images may be produced, each thumbnail being observable and useful for searching applications, without the necessity of achieving full JPEG decompression of the original image.

SUMMARY OF THE INVENTION

This invention is a method and apparatus for producing low resolution decompressed images directly, at low cost, without doing a full JPEG decompression. The new algorithm is expected to be used in a context such as image searching where the thumbnails are required but the full decompressed image is not. The larger details of the original image are still visible on the lower resolution decompressed images consequently, it is not necessary to perform a complete JPEG decompression to determine if the image contains those details.

In one dimension, the method of the invention implements a factorization of the inverse DCT of order eight (8) into three phases. At the end of the first phase, two disjoint transforms of order four (4) are produced, and similarly, at the end of the second phase four transforms of order two (2) are produced. The third and final phase produces the original image data in the time or pixel domain.

In two dimensions, the inverse DCT is a two-dimensional transform of 8×8 subimages where the first component is the average of the 8×8 subimage, the second phase produces four (4) terms each of which are averages of four disjoint 4×4 subimages, the third produces 16 terms each of which is the average of 16 disjoint subimages, and the last produces all 64 terms or pixels in the 8×8 regional image, i.e., 64 subimages of size 1×1.

DESCRIPTION OF DRAWINGS

FIG. 4 shows the JPEG image thumbnails at various stages of the decompression process.

DETAILED DESCRIPTION

Figure 1A:
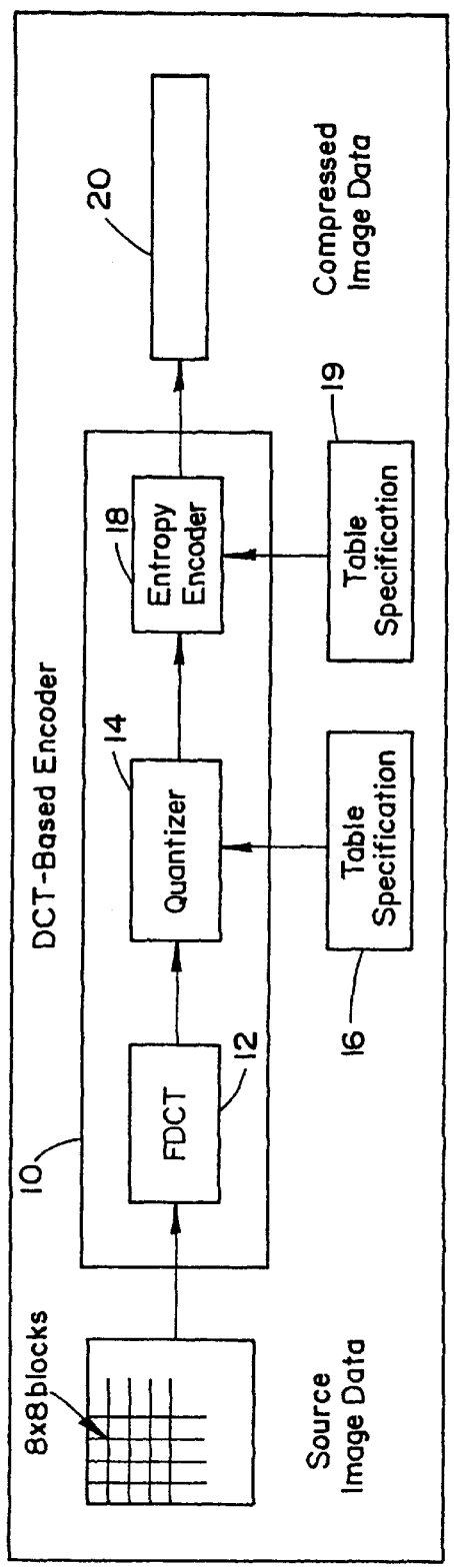
FIG. 1(a) illustrates a DCT-based encoder for achieving JPEG image compression.
Figure 1B:
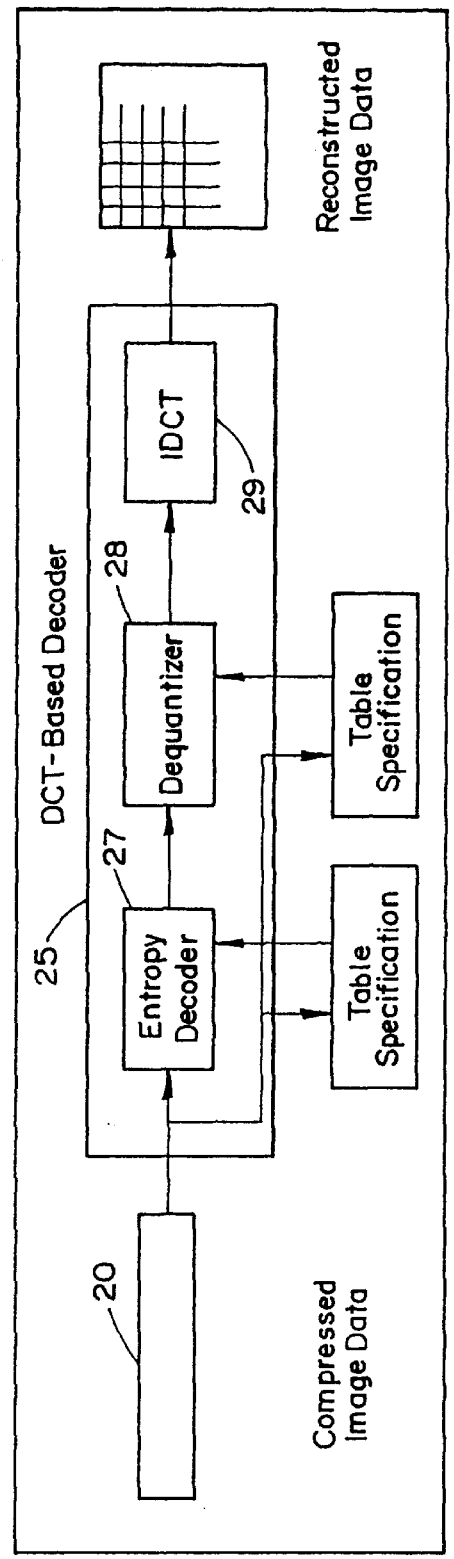
FIG. 1(b) illustrates a DCT-based decoder for decompressing a JPEG-encoded image.
Figure 2:
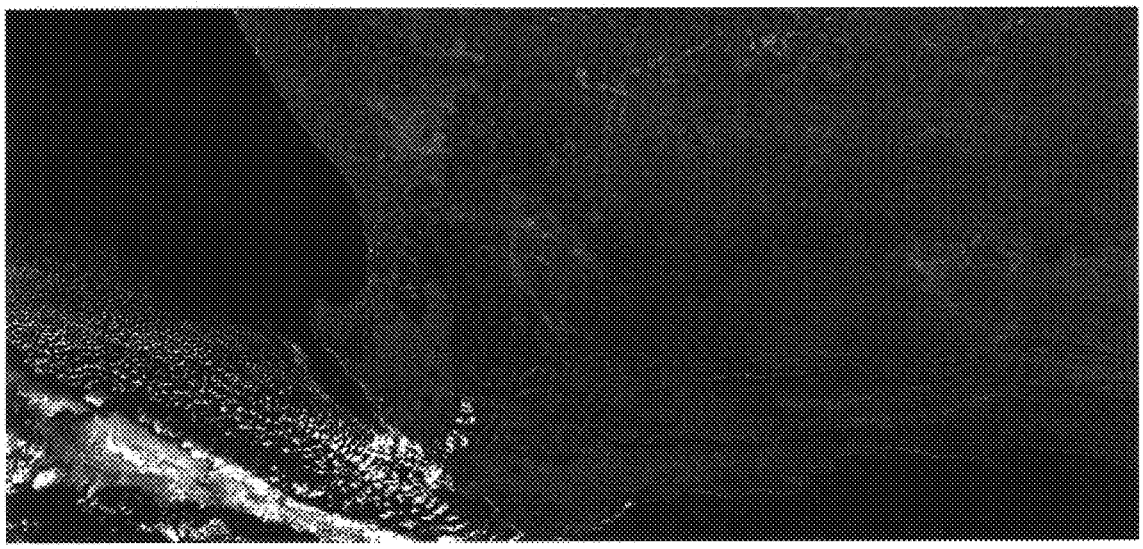
FIG. 2 is a satellite image of the coast of South Africa taken by a NOAA satellite. The image size is 1024 by 512.
Figure 4A:
FIG. 4(a) illustrates a thumbnail directly available from the DC components of the individual blocks, and has a resolution equal to 1/64th of the original.
Figure 4B:
FIG. 4(b) show a thumbnail at 1/16th of the original resolution.
Figure 4C:
FIG. 4(c) show a thumbnail at 1/4th of the original resolution.

The method of the present invention is a scheme to progressively achieve full JPEG decompression by factoring the inverse direct cosine transform ("DCT") of order eight (8) into three phases. At the end of the first phase two disjoint transforms of order four (4) are produced, and similarly, at the end of the second phase four transforms of order two (2) are produced. The third and final phase produces the original image data in the time or pixel domain, such as shown in FIG. 4. For exemplary purposes, an original image is defined to be a sampled still image, such as an original image shown in FIG. 2. As will be described, the data produced at the end of each phase contains progressively higher resolution information about the original image. In a preferred embodiment, the thumbnail images are computed directly by the inverse DCT processor 29 as shown in FIG. 1(a) without necessarily producing the full resolution DCT inversion, as will be described.

As known, the DCT matrix is widely used in image compression algorithms, and encompasses many forms. In the preferred embodiment of the invention, a form is used having the property that the transpose of the DCT matrix is the inverse of the DCT matrix. In the one-dimensional case, a DCT matrix operator having this property has been derived in the Feig and Winograd reference. Generally, the DCT matrix of order N is defined in terms of cosines of multiples of an angle $\omega_o = 2\pi/4N$, i.e., $\cos(m\omega_o)$ which is represented by y(m) with m being an integer. With matrix elements $c_{i,j} = \sqrt{2}/N \; y(i(2j+1))$ for $i>0$, $c_{i,j} = 1\sqrt{N}$ for $i=0$ the normalized 8-point DCT matrix is set forth in equation (1) as follows:

$$C_8 = \begin{bmatrix} y(4) & y(4) & y(4) & y(4) & y(4) & y(4) & y(4) & y(4) \\ y(1) & y(3) & y(5) & y(7) & -y(7) & -y(5) & -y(3) & -y(1) \\ y(2) & y(6) & -y(6) & -y(2) & -y(2) & -y(6) & y(6) & y(2) \\ y(3) & -y(7) & -y(1) & -y(5) & y(5) & y(1) & y(7) & -y(3) \\ y(4) & -y(4) & -y(4) & y(4) & y(4) & -y(4) & -y(4) & y(4) \\ y(5) & -y(1) & y(7) & y(3) & -y(3) & -y(7) & y(1) & -y(5) \\ y(6) & -y(2) & y(2) & -y(6) & -y(6) & y(2) & -y(2) & y(6) \\ y(7) & -y(5) & y(3) & -y(1) & y(1) & -y(3) & y(5) & -y(7) \end{bmatrix} \quad (1)$$

As known, this normalization produces an inverse matrix $D_8$ with the property that $D_8 = C^t_8$. The elements of the inverse matrix D has coefficients $d_{i,j}$ given by $d_{i,j} = \sqrt{2}/N \; y(j \; (2i+1))$ for $j>0$, $d_{i,j} = 1/\sqrt{N}$ for $j=0$.

Figure 3:
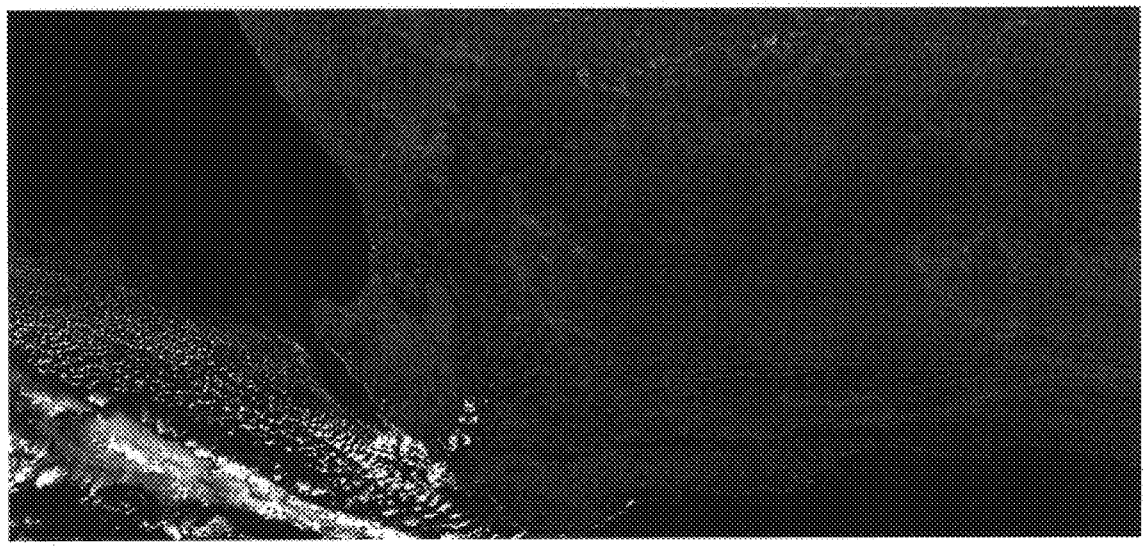
FIG. 3 is the same image after JPEG compression and decompression.

According to the principles of the invention, to achieve progressive decompression, a multi resolution factorization of Da is required. Thus, from the inverse matrix $D_8$, a factorization is performed to generate two blocks of size four (4), then four (4) blocks of size two (2), and finally eight (8) blocks of size one, which form the original time samples or pixels. In a first level of inversion, a single discrete cosine component is first extracted from each 8×8 block and the resulting components are combined into a thumbnail sketch 1/64th the size of the original image to result in the partially decompressed image of FIG. 4(a). After one level of inversion, the image will be composed of 4×4 blocks, and a thumbnail produced from these blocks will contain 1/16th the original number of points as shown in the partially decompressed image of FIG. 4(b). The next level of inversion produces a thumbnail with 1/4th the number of points as shown in the partially decompressed image of FIG. 4(c), and the last level of inversion produces the full decompressed JPEG image shown in FIG. 3. It can be seen in the thumbnail images of FIGS. 4(a)–(c) that the larger details corresponding to the original image are still visible even at the lower resolution.

In the multi resolution analysis just described, use is made of Hadamard transforms HN, which lend themselves directly to multi resolution analysis as they exhibit the property that a matrix of order N can be built recursively from lower order Hadamard matrixes, e.g., Hadamard matrix of order 2. That is, a Hadamard matrix $H_N$ can be recursively factored as $H_N = H_2 \times H_{N/2}$. From this it follows that a matrix of order $H_8 = H_2 \times H_4$ and thus, H can be factored in accordance with equation (2) as follows:

$$H_8 = (H_2 33\ I_4)\ (I_2 \times (H_2 33\ I_2))\ (I_4 \times H_2) \quad (2)$$

where $I_r$ is an identity matrix of rank r. Note that $H_2$ is symmetric and unitary (self inverse). It can be shown that all Hadamard matrices of rank $2^m$ are symmetric and unitary. Note that each of three factors of $H_8$ are symmetric, unitary, and commute with each other.

Therefore, as set forth in equation (3), $D_8$ is factored in accordance with equation (1) as follows:

$$D_8 = H_8 V = (H_2 33\ I_4)\ (I_2 \times (H_2 \times I_2))(I_4 \times H_2) V \quad (3)$$

allowing for the solution of V as set forth in equation (4) as follows.

$$V = H_8 D_8 = (H_4 \times I_2)\ (I_2 \times (H_2 \times I_2))\ (H_2 \times I_4) D_8 \quad (4)$$

Using equation (4) and making liberal use of the cosine relation
$\cos(a) + \cos(b) = 2\cos((a+b)/2)\cos((a-b)/2)$, V has the structure:

$$v = \begin{bmatrix} 1 & 0 & 0 & 0 & 0 & 0 & 0 & 0 \\ 0 & \gamma(2)\gamma(7) & 0 & \gamma(5)\gamma(6) & 0 & \gamma(3)\gamma(6) & 0 & \gamma(2)\gamma(1) \\ 0 & \gamma(6)\gamma(1) & 1 & \gamma(3)\gamma(2) & 0 & -\gamma(5)\gamma(2) & 0 & -\gamma(6)\gamma(7) \\ 0 & 0 & 0 & 0 & 1 & 0 & 0 & 0 \\ 0 & \gamma(2)\gamma(1) & 0 & -\gamma(3)\gamma(6) & 0 & \gamma(5)\gamma(6) & 0 & -\gamma(2)\gamma(7) \\ 0 & 0 & \gamma(6) & 0 & 0 & 0 & \gamma(2) & 0 \\ 0 & 0 & \gamma(2) & 0 & 0 & 0 & -\gamma(6) & 0 \\ 0 & -\gamma(6)\gamma(7) & 0 & \gamma(5)\gamma(2) & 0 & \gamma(3)\gamma(2) & 0 & -\gamma(6)\gamma(1) \end{bmatrix}$$

which structure can be applied to directly invert an 8-point DCT in 20 multiply and 14 additions when implementing Huffman decoding. As 24 addition operations are required to multiply by Hs, the inversion of $D_8$ requires a total of 20 multiplication and 38 addition operations.

The operation count can be lowered in many ways. By considering a 2×2 submatrix $G_2$ given by equation (5) as follows:

$$G_2 = \begin{bmatrix} \gamma(6) & \gamma(2) \\ \gamma(2) & -\gamma(6) \end{bmatrix} \quad (5)$$

Feig and Winograd show that multiplying matrix $G_2$ with a 2-vector and employing a standard "rotator" product will require three (3) multiplication and three (3) addition operations thus, enabling the sum and difference components of y(6) and y(2) to be precomputed and not counted as part of the algorithm.

It should be understood that the costly part of multiplication by V when calculating the inverse DCT in equation (3) above, is the multiplication of a 4×4 submatrix $Q_4$ defined in equation (6) as follows:

$$Q_4 = \begin{bmatrix} \gamma(2)\gamma(7) & \gamma(5)\gamma(6) & \gamma(3)\gamma(6) & \gamma(1)\gamma(2) \\ \gamma(1)\gamma(6) & \gamma(2)\gamma(3) & -\gamma(2)\gamma(5) & -\gamma(6)\gamma(7) \\ \gamma(1)\gamma(2) & -\gamma(3)\gamma(6) & \gamma(5)\gamma(6) & -\gamma(2)\gamma(7) \\ -\gamma(6)\gamma(7) & \gamma(2)\gamma(5) & \gamma(2)\gamma(3) & -\gamma(1)\gamma(6) \end{bmatrix} \quad (6)$$

This sub-matrix can be factorized in either of two ways. In the first factorization approach, the rows and columns of $Q_4$ are permuted by matrices $P_{1,4}$ and $P_{2,4}$ to create the matrix $R_4$ in accordance with equation (7).

$$R_4 = P_{1,4} Q_4 P_{2,4} = \begin{bmatrix} 0 & 1 & 0 & 0 & 1 & 0 & 0 & 0 \\ 0 & 0 & 0 & 1 & 0 & 0 & 1 & 0 \\ & & Q_4 & & & & & \\ 0 & 0 & 1 & 0 & 0 & 0 & 0 & 1 \\ 1 & 0 & 0 & 0 & 0 & 1 & 0 & 0 \end{bmatrix} \quad (7)$$

$$= \begin{bmatrix} 1 & 0 & \gamma(2)/\gamma(6) & 0 \\ 0 & 1 & 0 & \gamma(2)/\gamma(6) \\ \gamma(2)/\gamma(6) & 0 & -1 & 0 \\ 0 & -\gamma(2)/\gamma(6) & 0 & 1 \end{bmatrix}$$

$$= \begin{bmatrix} \gamma(6)\begin{bmatrix} \gamma(1) & -\gamma(7) \\ \gamma(7) & -\gamma(1) \end{bmatrix} & 0 \\ 0 & \gamma(6)\begin{bmatrix} \gamma(3) & -\gamma(5) \\ \gamma(5) & -\gamma(3) \end{bmatrix} \end{bmatrix}$$

The two blocks in the right-hand factor of equation (7) can each be rotated with 3 multiplication and 3 addition operations by the scheme such as described in Feig and Winograd. The left-hand factor of equation (7) produces 4 more multiplication and 4 more addition operations, bringing the total count to 10 multiplication and 10 addition operations. When combined with the 3 multiplication and 3 addition operations for $G_2$, and the 24 addition operations for multiplication by $H_8$, the entire computation requires 13 multiplication and 37 addition operations, and up to two normalization multiplications. Six of the eight normalizations can be subsumed in the constants in V. The normalizations may also be subsumed within the image search operations or in color maps, depending on how the data are used.

The operation count is reduced during the progressive factorization when calculating the thumbnails in the one-dimensional case. For instance, when calculating the thumbnail corresponding to the Level 0 decompression level, the rows of $R_4$ (equation (7)) do not participate. At decompression levels 1 through 3, the third row participates, then the first row, then rows two and four of equation (7). Particularly, the progressive calculation starts the rotation, and holds the intermediate values for later iterations. Thus, at decompression Level 1, the factorization starts two rotations. At decompression Level 2, it does the operations implied by two rows of the left-hand factor of equation (7). At decompression Level 3 it completes the two partial rotations and does the operations implied by the two remaining rows of equation (7). The operation count for the progressive calculation of $R_4$ is thus 10 multiplication and 10 addition operations, which break down into 5 multiplication and 5 addition operations at Level 1 decompression, 3 multiplication and 3 addition operations at Level 2 decompression, and 2 multiplication and 2 addition operations at Level 3 decompression. As demonstrated, early termination results in less work using the first sub-matrix factorization approach.

In the second factorization approach, a sub-matrix $G_4$ is derived, such as demonstrated by Feig and Winograd and shown in equation (8) as:

$$G_4 = \begin{bmatrix} \gamma(5) & \gamma(7) & \gamma(3) & \gamma(1) \\ -\gamma(1) & \gamma(5) & -\gamma(7) & \gamma(3) \\ -\gamma(3) & -\gamma(1) & \gamma(5) & -\gamma(7) \\ \gamma(7) & -\gamma(3) & -\gamma(1) & \gamma(5) \end{bmatrix} \quad (8)$$

In accordance with the factorization scheme demonstrated in Feig and Winograd, the sub-matrix $Q_4$ can be set forth in accordance with equation (9).

$$Q_4 = \begin{bmatrix} 1 & 0 & 0 & -1 \\ 1 & 0 & 0 & -1 \\ 0 & -1 & -1 & 0 \\ 0 & 1 & -1 & 0 \end{bmatrix} G_4 \begin{bmatrix} 1 & 0 & 0 & 0 \\ 0 & 0 & 1 & 0 \\ 0 & 0 & 0 & 1 \\ 0 & 1 & 0 & 0 \end{bmatrix} \quad (9)$$

It follows that $Q_4$ can be factored in the same operations as $G_4$ with four more additions due to the left-hand factor of equation (9). Thus, the final count for factorization of $Q_4$ is 8 multiplication and 16 addition operations. When combined with the 3 multiplication and 3 addition operations for $G_2$, and the 24 addition operations for multiplication by $H_8$, the entire computation requires 11 multiplication and 43 addition operations with no other normalizations required for the full inverse. However, normalizations are necessary to produce the intermediate thumbnails. The thumbnail corresponding to Level 1 decompression requires two shift operations and the thumbnail corresponding to Level 2 decompression requires two multiplication operations.

From equation (9), it follows that the second factorization approach also has a progressive realization. For instance, as shown in equation (9), the first two rows of the left-hand factor of $Q_4$ depend only on the first and fourth rows of $G_4$, and the last two rows of the left-hand factor $Q_4$ depend only on the second and third rows of $G_4$. This requires only a partial computation of the effect of the $G_4$ operation for the Level 1 thumbnail, followed by computation of the remainder as required for the refined thumbnails. The operation count for the progressive calculation of equation (9) is 4 multiplication and 8 addition operations at Level 1 decompression, 2 multiplication and 4 addition operations at Level 2 decompression, and 2 multiplication and 4 addition operations at Level 3 decompression, reducing the $Q_4$ cost by a factor of 2 when the thumbnail search terminates at Level 1.

It should be understood that the relative speed of the two factorization approaches described herein with respect to the one-dimensional case depends on the relative speed of multiplication and addition operations, with each approach being relatively equivalent in the instance of full decompression. However, the first factorization is likely to be the fastest when thumbnail images at decompression Level 1 are calculated.

The calculation of the inverse DCT of equation (3) is now described for the two-dimensional case, which, as is understood, directly applicable to image processing applications. From equation (3) above, the 2-D inverse DCT is derived and set forth according to equation (10) as follows:

$$D_8 \times D_8 = (H_8 \times H_8)(V \times V) \quad (10)$$

The matrix V is computationally equivalent to the direct sum of $I_2$, $G_2$, and $R_4$ with $G_2$ defined above in equation (5) and $R_4$ defined above in equation (7). The computation of $V \times V$ breaks down into computations of all cross products for the direct sum components of V. Table 1 is a summary of the operation counts per cross product.

Compositional costs of cross product components

TABLE 1

| Component | $I_2 \times I_2$ | $I_2 \times G_2$ | $I_2 \times R_4$ | $G_2 \times G_2$ | $G_2 \times R_4$ | $R_4 \times R_4$ | $H_8 \times H_8$ | Total Count |
|---|---|---|---|---|---|---|---|---|
| Repetitions | 1 | 2 | 2 | 1 | 2 | 1 | 1 | |
| Multiplications | 0 | 6 | 20 | 2 | 16 | 32 | 0 | |
| Additions | 0 | 6 | 20 | 10 | 32 | 92 | 384 | |
| Shifts | 0 | 0 | 0 | 2 | 4 | 8 | 384 | |
| Total Multiplications | 0 | 12 | 40 | 2 | 32 | 32 | 0 | 118 |
| Total Additions | 0 | 12 | 40 | 10 | 64 | 92 | 384 | 602 |
| Total Shifts | 0 | 0 | 0 | 2 | 8 | 8 | 384 | 402 |

The resulting count for $G_{2 \times R4}$ is due to the factorization described in equation (11) as follows:

$$G_2 \times R_4 = \begin{bmatrix} -\gamma(6) & \gamma(2) \\ -\gamma(2) & -\gamma(6) \end{bmatrix} \times \begin{bmatrix} \gamma(6) \begin{bmatrix} \gamma(1) & -\gamma(7) \\ -\gamma(7) & -\gamma(1) \end{bmatrix} & \gamma(2) \begin{bmatrix} \gamma(3) & -\gamma(5) \\ \gamma(5) & \gamma(3) \end{bmatrix} \\ -\gamma(2) \begin{bmatrix} -\gamma(1) & \gamma(7) \\ -\gamma(7) & -\gamma(1) \end{bmatrix} & \gamma(6) \begin{bmatrix} -\gamma(3) & \gamma(5) \\ \gamma(5) & \gamma(3) \end{bmatrix} \end{bmatrix} \quad (11)$$

$$= \begin{bmatrix} 1 & 0 & 0 & 0 & 0 & 0 & 0 & 0 \\ 0 & 1 & 0 & 0 & 0 & 0 & 0 & 0 \\ 0 & 0 & -1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & -1 & 0 \\ 0 & 0 & 0 & 0 & 0 & 0 & 0 & 1 \end{bmatrix}$$

$$((G_2 \times G_2) \times I_2)I_2 \times \left( \begin{bmatrix} \gamma(1) & -\gamma(7) & & \\ -\gamma(7) & -\gamma(1) & & \\ & & \gamma(3) & -\gamma(5) \\ & & \gamma(5) & \gamma(3) \end{bmatrix} \right)$$

The cost of the matrix multiply by $G_2 \times G_2$ is 2 multiplication operations, 10 addition operations, and 2 shift operations as derived from the Feig and Winograd reference. This doubles when taking the cross product with $I_2$. The cost of each of the 2×2 blocks in equation (11) is 3 multiplication and 3 addition operations from the rotator operation described above. In this case, there are four rotations because of the cross product with $I_2$ resulting in a total cost of 16 multiplication operations, 32 addition operations, and 4 shift operations, as shown in Table 1.

The matrix $R_4 \times R_4$ can be written according to equation (12) as follows:

$$R_4 \times R_4 = S^* P_{16}(I_2 \times G_2 \times G_2 \times I_2) P_{16}((B_1 \oplus B_2) \times (B_1 \oplus B_2)) \quad (12)$$

where the matrix S is the diagonal matrix whose diagonal is (1,1,1−1,1,1,1,−1,1,1−1,−1,−1,−1,1), the block matrices $B_1$ and $B_2$ are the sub-blocks found in the right-hand factor of $R_4$ from equation (7), and $P_{16}$ is the permutation matrix shown in equation (13) as:

$$P_{16} = \begin{bmatrix} I_4 & 0 & 0 & 0 \\ 0 & 0 & I_4 & 0 \\ 0 & I_4 & 0 & 0 \\ 0 & 0 & 0 & 0 \end{bmatrix} \quad (13)$$

The factor of equation (12) containing $G_2$ requires four multiplications by $G_2 \times G_2$, which requires 2 multiplication operations, 10 addition operations, and 2 shift operations each, for a total of 8 multiplication operations, 40 addition operations, and 4 shift operations. The tensor products $(B_1 \oplus B_2) \times (B_1 \oplus B_2))$ of equation (12) breaks up into four cross products $B_1 \times B_1$, $B_2 \times B_2$, $B_1 \times B_2$ and $B_2 \times B_1$. The first two of these factor in the same way that $G_2 \times G_2$ factors to yield the identities shown in equations (14) and (15) as follows:

$$B_1 \times B_1 = \begin{bmatrix} 1 & 0 & 1 & 0 \\ 0 & 1 & 0 & 1 \\ 0 & 1 & 0 & -1 \\ -1 & 0 & 1 & 0 \end{bmatrix} \begin{bmatrix} \gamma(3)\gamma(5) & -\gamma(1)\gamma(7) & & \\ -\gamma(1)\gamma(7) & -\gamma(3)\gamma(5) & & \\ & & 0 & 0 \\ & & 0 & 0 \end{bmatrix} \begin{bmatrix} 0 & 0 & 1 & 0 & 0 & -1 \\ 0 & 0 & 0 & 1 & 1 & 0 \\ 1/2 & 0 & 1 & 0 & 0 & 1 \\ 0 & 1/2 & 0 & 1 & -1 & 0 \end{bmatrix} \quad (14)$$

$$B_2 \times B_2 = \begin{bmatrix} 1 & 0 & 1 & 0 \\ 0 & 1 & 0 & 1 \\ 0 & 1 & 0 & -1 \\ -1 & 0 & 1 & 0 \end{bmatrix} \begin{bmatrix} \gamma(1)\gamma(7) & -\gamma(3)\gamma(5) & & \\ \gamma(3)\gamma(5) & \gamma(1)\gamma(7) & & \\ & & 0 & 0 \\ & & 0 & 0 \end{bmatrix} \begin{bmatrix} 0 & 0 & 1 & 0 & 0 & -1 \\ 0 & 0 & 0 & 1 & 1 & 0 \\ 1/2 & 0 & 1 & 0 & 0 & 1 \\ 0 & -1/2 & 0 & 1 & -1 & 0 \end{bmatrix} \quad (15)$$

Each of these identities requires 3 multiplication operations, 11 addition operations, and 2 shift operations.

The other two cross products can be computed by nesting the rotator relationship as described above. The final count for the full calculation of $R_4 \times R_4$ breaks into 8 multiplication operations, 40 addition operations, and 4 shift operations for $G_2 \times G_2$, 6 multiplication, 22 addition and 4 shift operations for the first two cross products $B_i \times B_i$, and 18 multiplication and 30 addition operations in the remaining two cross products. The total cost to multiply by V×V is thus 120 multiplication operations, 216 addition operations, and 22 shift operations. To produce the Level 1 thumbnail, a further 128 addition and 128 shift operations are required after doing the V×V calculation. The Level 2 and Level 3 thumbnails each require 128 more addition and shift operations. The entire inversion requires 118 multiplication operations, 602 addition operations, and 402 shifts, as shown in Table 1. It should be understood that a computational trade-off exists and that skilled artisans may devise ways to lower the addition operation count by selecting approaches that increase the multiplication count. The factorization has various progressive forms that are more efficient when early termination is likely.

The progressive form, as described herein, allows computational savings when early termination is possible. Further computational savings is realized by computing the Level 1 and 2 thumbnails directly, and terminating the computation at that point without producing the full resolution DCT inversion.

The Level 0 thumbnail is already known as being directly available in the DCT by extracting the zero frequency terms from each of the 8×8 blocks. The Level 1 thumbnail is obtained in one dimension with only 4 multiplication and 5 addition operations as now described:

Letting $T_1$ be the matrix of equation (16):

$$T_1 = \begin{bmatrix} 1 & 0 & 0 & 0 & 0 & 0 & 0 & 0 \\ 0 & \gamma(1)\gamma(2) & 0 & -\gamma(3)\gamma(6) & 0 & \gamma(5)\gamma(6) & 0 & -\gamma(2)\gamma(7) \end{bmatrix} \quad (16)$$

then $$T_1 C_8 = (1\sqrt{8}) \begin{bmatrix} 1 & 1 & 1 & 1 & 1 & 1 & 1 & 1 \\ 1 & 1 & 1 & 1 & -1 & -1 & -1 & -1 \end{bmatrix} \quad (17)$$

and $$(1/2) H_2 T_1 C_8 = (1\sqrt{8}) \begin{bmatrix} 1 & 1 \\ 1 & -1 \end{bmatrix} T_1 C_8 \quad (18)$$

$$= (1/4) \begin{bmatrix} 1 & 1 & 1 & 1 & 0 & 0 & 0 & 0 \\ 0 & 0 & 0 & 0 & -1 & -1 & -1 & -1 \end{bmatrix}$$

The normalization factor $1/\sqrt{3}$ can be incorporated in the second row of T1. However, the normalization of the first row will require one more multiplication operations if it cannot be absorbed elsewhere.

To compute the Level 2 thumbnail in the one-dimensional case, use is made of the Level 1 thumbnail computation which is incorporated into the matrix W set forth in equation (19) as follows:

$$W = \begin{bmatrix} 1 & 0 & 0 & 0 & 0 & 0 & 0 & 0 \\ 0 & \gamma(1)\gamma(2) & 0 & -\gamma(3)\gamma(6) & 0 & \gamma(5)\gamma(6) & 0 & -\gamma(2)\gamma(7) \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \end{bmatrix} \quad (19)$$

The first two rows of W are the rows of $T_1$ and the remaining six rows permute components of a vector that it multiplies. Two additional intermediate components of the Level 2 thumbnail are obtained by using the matrix $T_2$ defined in equation (20) as follows:

$$T_2 = \begin{bmatrix} 1/\sqrt{8} & 0 & 0 & 0 & 0 & 0 & 0 & 0 \\ 0 & \gamma(6)\gamma(6) & 0 & 0 & 0 & 0 & \gamma(3)\gamma(6) & -\gamma(5)\gamma(6) \\ 0 & 1/\sqrt{8} & 0 & 0 & 0 & 0 & 0 & 0 \\ 0 & 0 & \gamma(2)\gamma(4)/2 & 0 & -\gamma(4)\gamma(6)/2 & 0 & 0 & 0 \end{bmatrix}$$

This matrix has the following property:

$$T_2 W C_8 = (1/8) \quad (20)$$

$$= \begin{bmatrix} 1 & 1 & 1 & 1 & 1 & 1 & 1 & 1 \\ 1 & 1 & -1 & -1 & 1 & 1 & -1 & -1 \\ 1 & 1 & 1 & 1 & -1 & -1 & -1 & -1 \\ 1 & 1 & -1 & -1 & -1 & -1 & 1 & 1 \end{bmatrix}$$

$$(1/4)(H_2 \times H_2) \times [\,1\ \ 1\,]$$

where $H_2$ is the Hadamard matrix of order two (2) as described above. The Level 2 thumbnail is computed from equation (20) and some operations can be saved because the Level 1 thumbnail is already computed.

To generalize the foregoing, given an eight (8) vector x whose DCT is y, the matrix product is calculated as:

$$2(H_2 \times H_2) T_2 W y = 2(H_2 \times H_2) T_2 W C_8 x \quad (21)$$

$$= 2(H_2 \times H_2)(1/4)((H_2 \times H_2) \times [\,1\ \ 1\,])x$$

$$= (1/2) \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix} x.$$

The reduced product follows directly from the fact that the $H_2$ is self inverse. Equation (21) suggests that the operations required to compute the Level 2 thumbnail are those in $H_2 \times H_2$ and $T_2$, however better results can be achieved because the Level I thumbnail contains some operations within the matrix $H_2 \times H_2$. $H_2 \times H_2$ factors into $$H_2 \times H_2 = (H_2 \times I_2)(I_2 \times H_2) \quad (22)$$

$$= (H_2 \times I_2) \begin{bmatrix} 1 & 0 & 0 & 0 \\ 0 & 1 & 0 & 0 \\ 0 & 0 & 1 & 1 \\ 0 & 0 & 1 & -1 \end{bmatrix} \begin{bmatrix} 1 & 1 & 0 & 0 \\ 1 & -1 & 0 & 0 \\ 0 & 0 & 1 & 0 \\ 0 & 0 & 0 & 1 \end{bmatrix}$$

$$= (H_2 \times I_2)(I_2 \oplus H_2)(H_2 \oplus I_2)$$

Equation (22) shows how the Kronecker products break out into products of direct sums of $H_2$ and $I_2$. The factor $H_2 \times I_2$ in equation (22) also factors into similar products of row permutations of direct sums of $H_2$ and $I_2$. When broken into four factors, the various pairs of the four factors of equation (22) commute, and allow for performance of the matrix multiplication with any specific factor performed first. One of the four factors is equivalent to the multiplication done in equation (18). The computation can be arranged to do this factor first, and because it is performed for the Level 1 thumbnail its result can be reused for the Level 2 thumbnail without repeating its operations. Thus, only 6 addition operations are required to do the Level 2 thumbnail.

The additional cost of computing the Level 2 thumbnail is 5 multiplication operations, 3 addition operations, and two normalization multiplications for the multiplication by $T_2$ and 6 addition operations for equation (22). The total for both thumbnails is 9 multiplication and 14 addition operations, and up to 3 additional normalization multiplications if they are required.

For two dimensions, the Level 1 thumbnail uses the matrix $T_1 \times T_1$, to create the four sums of the 4×4 disjoint subblocks of the 8×8 blocks of pixels. The four sums are the components of the column vector produced by multiplying the DCT of a block of pixels by $$(1/4)(H_2 \times H_2)(T_1 \times T_1) = (1/8)\begin{bmatrix} 1 & 1 & 1 & 1 \\ 1 & 1 & -1 & -1 \\ 1 & -1 & 1 & -1 \\ 1 & -1 & -1 & 1 \end{bmatrix}(T_1 \times T_1) \quad (23)$$

Expansion of $T_1 \times T_1$ shows that it has 24 non unit multipliers so that only 24 multiplication operations are required. One row has 1 nonzero term, two rows have 4 nonzero, and one row has 16 nonzero, thereby requiring 21 addition operations. The left factor of equation (23) requires 8 more addition and 4 shift A operations to produce a total of 24 multiplication operations, 29 addition operations, and 4 shift operations for the Level 1 thumbnail in two dimensions.

The Level 2 thumbnail computes $(H_2 \times H_2 \times H_2 \times H_2)$ $(T_2 \times T_2)$ (W×W) x, but the Level 1 thumbnail has already produced most of the components of (W×W) x and some of the operations in $(H_2 \times H_2 \times H_2 \times H_2)$. There are 39 multiplication and 27 addition operations required to complete (W×W) x. The remaining cost for the Level 2 thumbnail are the operations in $(H_2 \times H_2 \times H_2 \times H_2)$ and $T_2 \times T_2$. The factor $T_2 \times T_2$ requires 25 multiplication and 21 addition operations because its four rows have 9, 6, 6, and 4 nonzero, respectively. The factor $(H_2 \times H_2 \times H_2 \times H_2)$ requires 64 addition operations, but by using a factorization similar to the one in equation (22), one can reuse the operations already performed to compute the Level 1 thumbnail. This reduces the number of addition operations to 56. Thus, the Level 2 thumbnail requires 64 multiplication and 104 addition operations after computing the Level 1 thumbnail, and the two thumbnails require a total of 88 multiplication operation operations, 133 addition operations, and 4 shift operations, which is much less costly than the full inversion of the 2-D DCT.

The foregoing merely illustrates the principles of the present invention. Those skilled in the art will be able to devise various modifications, which although not explicitly described or shown herein, embody the principles of the invention and are thus within its spirit and scope.

What is claimed is:

1. An apparatus for generating one or more images at various levels of decompression directly from a fully compressed baseline JPEG encoded image, said apparatus comprising:
   means for generating a matrix of disjoint subarrays of size n×n, each of said subarrays is a two-dimensional DCT of a corresponding subarray of elements from said compressed baseline JPEG encoded image;
   means for extracting one or more elements from each of said disjoint subarrays in accordance with a desired level of decompression and arranging said extracted elements in a predetermined order corresponding to an order of elements in a disjoint subarray from which they were extracted; and,
   means for arranging said extracted elements of predetermined order to generate a decompressed version of said original image, each said decompressed image having an image resolution a fraction of a resolution of an original image.

2. The apparatus of claim 1, wherein for a zeroth level of decompression, said means for extracting elements includes extracting all zero frequency components from each said disjoint subarrays of said matrix.

3. The apparatus of claim 2, wherein said zeroth level of decompression produces an image having 1/64th the resolution of said fully JPEG compressed image.

4. The apparatus of claim 1, wherein for a first level of decompression, said means for extracting elements includes extracting four elements at predefined locations from each said disjoint subarrays.

5. The apparatus of claim 4, wherein said first level of decompression produces an image having 1/16th the resolution of said fully JPEG compressed image.

6. The apparatus of claim 1, wherein for a second level of decompression, said means for extracting elements includes extracting sixteen elements at predefined locations from each said disjoint subarrays.

7. The apparatus of claim 6, wherein said second level of decompression produces an image having 1/4th the resolution of said fully JPEG compressed image.

8. An apparatus for generating one or more images at intermediate levels of decompression, at a zeroth level of decompression, and at a final level of decompression, each said intermediate level of decompression obtained directly from a fully compressed baseline JPEG encoded image, said apparatus comprising:
   means for progressively calculating images to achieve a desired intermediate level of decompression, said means utilizing information obtained from an intermediate level image generated for a decompression level immediately prior to the desired level of decompression to enable generation of images in a minimum of operations.

9. The apparatus of claim 8, wherein for said zeroth level of decompression, said progressive calculation means generates an image having 1/64th the resolution of said original JPEG compressed image.

10. The apparatus of claim 8, wherein for a first intermediate level of decompression, said progressive calculation means generates an image having 1/16th the resolution of said original JPEG compressed image.

11. The apparatus of claim 8, wherein for a second intermediate level of decompression, said progressive calculation means generates an image having 1/4th the resolution of said original JPEG compressed image.

12. The apparatus of claim 8, wherein said progressive calculation means comprises:
   means for generating a matrix of disjoint subarrays of size n×n, each subarray being a two-dimensional discrete cosine transform of a corresponding subarray of elements from a said compressed JPEG encoded image;
   means for extracting one or more elements from each of said disjoint subarrays in accordance with a desired level of decompression, and arranging said extracted elements in a predetermined order corresponding to an order of elements in a disjoint subarray from which they were extracted; and,
   means for combining said extracted elements of predetermined order to generate a decompressed version of said original image, each said decompressed image having an image resolution a fraction of a resolution of an original image.

13. The apparatus of claim 12, wherein a size "n" of disjoint subarrays is eight, said means for extracting elements at said zeroth level of decompression includes means for extracting a zero frequency component from each disjoint subarrays.

14. The apparatus of claim 13, wherein said means for extracting elements at said a first level of decompression include means for extracting four elements at predefined locations from each said disjoint subarrays.

15. The apparatus of claim 14, wherein said means for extracting elements at said first level of decompression includes means for averaging a group of sixteen pixels at predefined locations from said original image, said apparatus including processing means for transforming said n×n matrix into four disjoint blocks.

16. The apparatus of claim 15, wherein said processing means includes means for multiplying an n×n subarray by a cross product of a predefined 2×8 matrix.

17. The apparatus of claim 16, wherein for a second level of decompression, said means for extracting elements includes extracting sixteen elements at predefined locations from each said disjoint subarrays, said group of sixteen elements including said four elements and zero frequency components from each said disjoint subarrays.

18. The apparatus of claim 17, wherein said processing means includes means for multiplying said original n×n matrix by an first operator matrix having a submatrix equivalent to said predefined 2×8 matrix.

19. The apparatus of claim 18, wherein said first operator matrix is a matrix having a factorization of a form $(H_2 \times H_2 \times H_2 \times H_2)$ $(T_2 \times T_2)$ $(W \times W)$, where $H_2$ is a Hadamard matrix of order 2 and $T_2$ is an 8×4 matrix and W is a 8×8 matrix.

20. The apparatus of claim 19, wherein for a final level of decompression, said extracted elements include a set of 64 elements corresponding to all positions from said disjoint subarray.

21. The apparatus of claim 20, wherein said processing means includes means for multiplying said original n×n matrix by a second operator matrix $(H_8 \times H_8)$ $(V \times V)$, said multiplying step including means enabling utilization of data generated from a result of computing $(T_2 \times T_2)$ $(W \times W)$, where $H_8$ is a Hadamard matrix of order 8 and V is a predefined 8×8 matrix.

22. The apparatus of claim 20, wherein said original JPEG compressed image has been Huffman encoded, said apparatus including means for performing Huffman decoding on said original n×n matrix.

23. A method for generating one or more decompressed images at various levels of decompression directly from a fully compressed baseline JPEG encoded image, said compressed baseline JPEG encoded image represented as blocks of discrete cosine transformed pixels of an original image, said method comprising the steps of providing a progressive operator for calculating images at a desired level of decompression, each calculating step utilizing information obtained from a calculation of an image at a decompression level immediately prior to the desired level of decompression to enable generation of images in a minimum of operations.

24. The method for generating one of more decompressed images of claim 23, wherein said progressive operator is of a form $H_8 V$ where $H_8$ is a Hadamard matrix of order eight and V is a predefined 8×8 matrix.

25. The method for generating one or more decompressed images of claim 23, wherein said progressive operator is factored according to a form $(H_2 \times I_4)$ $(I_2 \times (H_2 \times I_2))$ $(I_4 \times H_2)$ V, where $H_2$ is a Hadamard matrix of order two, V is a predefined 8×8 matrix, $I_4$ and $I_2$ are identity matrices of rank four and two, respectively.

26. The method for generating one or more decompressed images of claim 23, wherein at a zeroth level of decompression, said calculating step includes the step of calculating V, where V is a predefined 8×8 matrix.

27. The method for generating one or more decompressed images of claim 26, wherein at a first level of decompression, said calculating step includes the step of calculating $(I_4 \times H_2) V H_2$), V, where $H_2$ is a Hadamard matrix of order to and $I_4$ is an identity matrix of rank four.

28. The method for generating one or more decompressed images of claim 27, wherein at a second level of decompression, said calculating step includes the step of calculating $(I_3 \times (H_2 \times I_2))$ $(I_4 \times H_2)$ V $H_2$) V, where $I_2$ is an identity matrix of rank two.

29. The method for generating one or more decompressed images of claim 28, wherein at a final level of decompression, said calculating step includes the step of calculating $(H_2 \times I_4)$ $(I_2 \times (H_2 \times I_2))$ $(I_4 \times H_2)$ V.

30. A method for generating one or more decompressed images at various levels of decompression directly from a fully compressed baseline JPEG encoded image, comprising the steps of:

(a) retrieving a fully compressed baseline JPEG encoded image;

(b) generating a matrix of disjoint subarrays of size n×n, each subarray being a two-dimensional DCT of a corresponding subarray of said compressed baseline JPEG encoded image;

(c) extracting one or more elements from each of said disjoint subarrays in accordance with a desired level of decompression, and arranging said extracted elements in a predetermined order corresponding to an order of a disjoint subarray from which said elements came; and (d) generating said image corresponding to a desired level of decompression from said extracted one or more elements.

31. A method according to claim 30, wherein said original JPEG compressed image has been Huffman encoded, said method further including after retrieving step (a), the step of preprocessing said compressed JPEG image according to a Huffman decoding.

32. A method according to claim 30, wherein a size "n" of said disjoint subarrays is eight, and for a zeroth level of decompression, said extracting step includes the step of extracting only one element from each of said subarrays.

33. A method according to claim 32, wherein said extracted only one element corresponds to element located at position (0,0) of said disjoint subarray.

34. A method according to claim 32, wherein for a first level of decompression, said extracted elements include a set of four elements at predefined locations from each of said disjoint subarrays, said group of four elements including a zero frequency component from each said disjoint subarray.

35. A method according to claim 34, wherein at said first level of decompression, said extracting step includes averaging a group of sixteen pixels at predefined locations from said n×n matrix corresponding to said original image, to obtain four disjoint blocks.

36. A method according to claim 35, wherein said locations for extracting said four components include positions (0,0), (4,0), (0,4) and (4,4) of said disjoint subarray.

37. A method according to claim 35, wherein at a second level of decompression, said extracted elements include a set of sixteen elements at predefined locations from each said disjoint subarrays, said group of sixteen elements including said four elements and zero frequency components from each said disjoint subarrays.

38. A method according to claim 37, wherein "n"=eight (8) and at said first level of decompression, said extracting step includes the step of multiplying each n×n subarray by a cross product of a predefined 2×8 matrix.

39. A method according to claim 38, wherein for said second level of decompression, said extracting step includes multiplying said original n×n matrix by a first operator matrix having a submatrix equivalent to said predefined 2×8 matrix.

40. A method according to claim 39, wherein said first operator matrix is a matrix having a factorization of a form $(H_2 \times H_2 \times H_2 \times H_2)(T_2 \times T_2)(W \times W)$, where $H_2$ is a Hadamard matrix of order 2 and $T_2$ is an 8×4 matrix and W is a 8×8 matrix.

41. A method according to claim 40, wherein for a final level of decompression, said extracted elements include a set of 64 elements corresponding to all positions from said disjoint subarray.

42. A method according to claim 41, wherein said extracting step includes the step of multiplying said original n×n matrix by a second operator matrix $(H_8 \times H_8)(V \times V)$, said multiplying step further including utilizing data generated from a result of computing $(T_2 \times T_2)(W \times W)$ of said first operator matrix, where $H_8$ is a Hadamard matrix of order eight and V is a predefined 8×8 matrix.

* * * * *